(12) United States Patent
Taylor

(10) Patent No.: US 6,536,610 B1
(45) Date of Patent: Mar. 25, 2003

(54) AIR BLOWER SUPPORT RACK

(76) Inventor: Patrick Scott Taylor, 10916 Pinto Dr., Hudson, FL (US) 34669

( * ) Notice: Subject to any disclaimer, the term of this patent is extended or adjusted under 35 U.S.C. 154(b) by 0 days.

(21) Appl. No.: 10/032,039

(22) Filed: Dec. 31, 2001

(51) Int. Cl.[7] .................................................. A47F 7/00
(52) U.S. Cl. ........................................................ 211/70.6
(58) Field of Search .......................... 211/70.6, 13.1, 211/113, 175; 224/403

(56) References Cited

U.S. PATENT DOCUMENTS

| | | | | |
|---|---|---|---|---|
| 2,835,503 A | * | 5/1958 | Humphries et al. | 211/70.6 |
| 2,943,744 A | * | 7/1960 | Atkinson, Sr. | 211/70.6 |
| 3,128,022 A | * | 4/1964 | Mastrud, Jr. | 211/26 |
| 6,302,280 B1 | * | 10/2001 | Bermes | 211/175 |
| 6,311,853 B1 | * | 11/2001 | Johnson | 211/113 |
| 6,409,029 B1 | * | 6/2002 | Bermes | 211/207 |

* cited by examiner

*Primary Examiner*—Alvin Chin-Shue
*Assistant Examiner*—Sarah Purol
(74) *Attorney, Agent, or Firm*—Ronald E. Greigg

(57) ABSTRACT

A storage rack for storing a back pack type leaf blower onto a trailer or other type carriers for storage and transport of the back pack leaf blower when not in use. The storage rack includes a base to which a pair of equal length support rods are secured for securing the back pack leaf blower and which includes a greater length rod to which the rigid tubular air exhaust is to be secured. The rack is secured to an appropriate carrier such as a trailer frame or truck body.

23 Claims, 2 Drawing Sheets

AIR BLOWER SUPPORT RACK

This invention is directed to an air blower rack and more particularly to a rack for supporting a back pack blower on a trailer rack or a pickup truck.

PRIOR ART

Heretofore racks for receiving and securing different types of blower devices have been developed for use with a truck bed or a trailer. Such patents include U.S. Pat. Nos. 5,007,568; 5,255,951; 5,836,494; 5,819,933; 4,830,242; 5,964,358; and 6,173,842. None of these patents are directed to a rack which can support a back-pack type on a truck bed or on a separate trailer.

SUMMARY AND ADVANTAGES

This invention is directed to a support rack for supporting a back-pack type blower on a truck bed or a separate towed trailer. The support rack has an advantage that the blower can be supported by a rack on a carrier for storage or during non use times.

Another advantage is the blower can be secured on the rack and then locked in place to prevent anyone from sealing the blower.

Another advantage is the blower can be supported in a usable position which permits a person to add gas to the tank and for securing the blower during starting the engine.

Still another advantage is the blower will be stored in a safe place so that it will not be left behind or forgotten if left in a nonsecured place.

Other objects and advantages will become obvious to one skilled in the art from a reading of the disclosure and review of the drawings.

DETAILED DESCRIPTION

Figure 1:
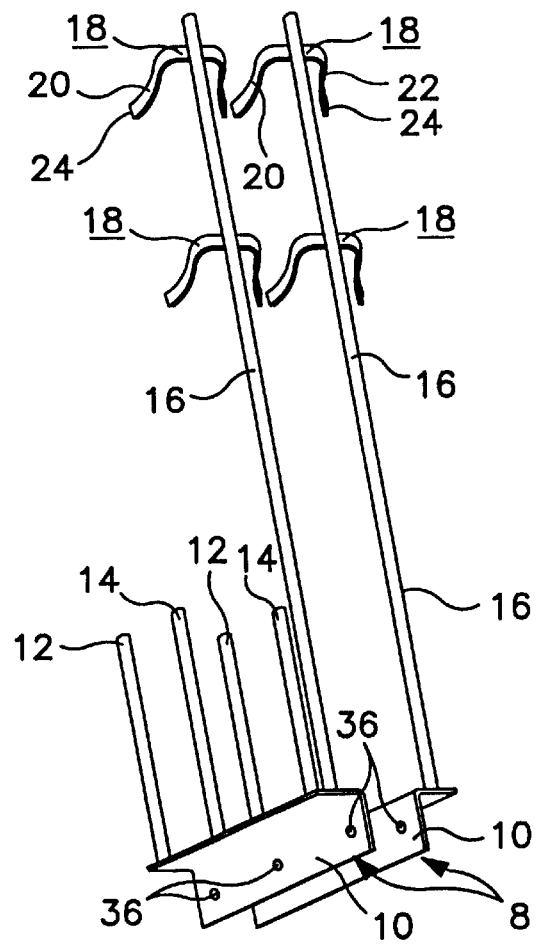
FIG. 1 is a perspective view illustrating a pair of the storage racks for inside and outside mounting on a support.
Figure 2:
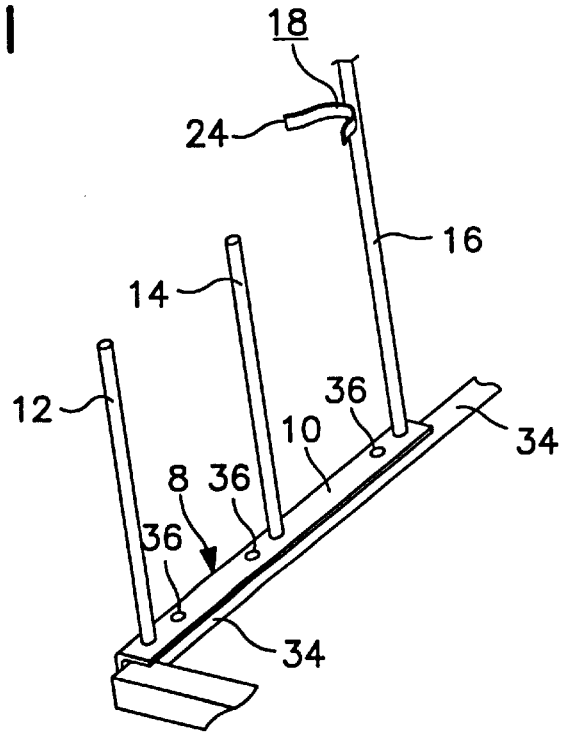
FIG. 2 is a perspective view from an opposite direction in order to see the different parts of one rack more clearly.

Now referring to the drawings there is shown a storage rack 8 particularly for a blower which may be used for blowing leaves into a pile or any other desired place. The storage rack 8 includes an angle iron or any other type base 10 to which spaced rods 12, 14 of any desired shape are welded or secured at one end to the angle iron base perpendicular thereto. Round rods are preferred. Spaced from rod 14 is a taller or longer rod 16 to which a pair of somewhat spaced U-shaped hangers 18 are secured. The back part of each hanger is secured at its mid-point to the taller rod with a first hanger secured at the upper end of the rod and a second hanger spaced from the first hanger. If needed more than two hangers can be secured to the taller rod. The U-shaped hanger has a straight back portion which is secured to the taller rod with outwardly extending arms 20, 22 which have a straight portion extending from the base in which the outer ends 24 of the straight portion are bent outwardly. The outwardly bent outer ends provide a spacing which permits easy access to the U-shaped hanger for receiving and holding a blower rigid tube 26 or ducting in place while the blower is supported on the upright rods 12 and 14.

The storage rack is made to support and store a commercial type leaf blower of a back pack type 28 on which is mounted a gasoline engine 27 that drives an air fan blower having a rigid exhaust 30 to which a short flexible piece of tubing 32 or ducting is secured in series with an elongated piece of rigid tubing 26 that is held in a user's hand while in use.

The leaf blower storage rack 8 is supported onto an upper rail 34 of a trailer frame which is made with pieces of angle iron secured together. The angle iron for the base 10 of the storage rack 8 can be secured to the trailer frame such that the vertical portion of the angle iron can be on the inside or outside of the trailer body. Further, the storage rack can be welded to the trailer frame for a permanent fixture or can be bolted onto the trailer rail so that the storage rack can be removed, if desired. It would be obvious to one skilled in the art that the trailer frame or body to which the storage rack is to be mounted can be other than angle iron. Therefore, the base of the storage rack can be made with material that can be secured to a body other than one made with angle iron such as wood.

When using angle iron for the base, appropriate mounting holes 36 can be made in the horizontal piece or the vertical piece whichever is appropriate. In order to insure that the mounting holes are in the appropriate piece of the angle iron base, holes could be made in each of the legs of the angle iron. It would also be obvious to one skilled in the art that the base be a flat piece of metal or wood instead of an angle iron in order to mount the storage rack on a flat surface or a surface other than an angle iron. The main purpose for the storage rack is to provide spaced vertical rods on which the leaf blower is secured and to provide appropriate hangers to which the blower exhaust rigid tubing is secured.

Figure 4:
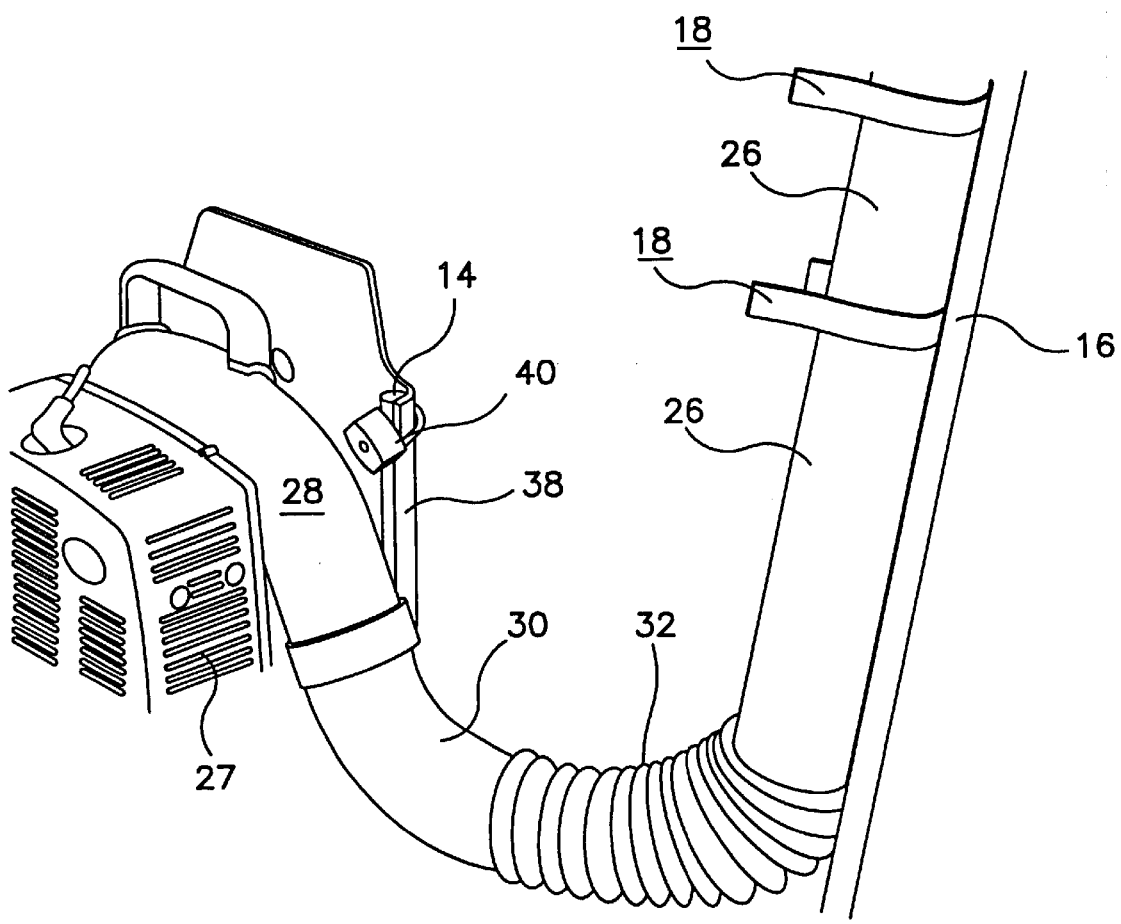
FIG. 4 illustrates a blower secured onto a rack.

As shown in FIG. 4, a leaf blower and the air exhaust connection 30 are shown supported by the leaf blower rack 28. The leaf blower is provided with an engine 36 that is secured to a back pack 28 as well known in the prior art. The back pack is provided with spaced upwardly extending tubular members or openings 38. These tubular members 38 are placed onto the spaced rods 12 and 14 so that the back pack is supported by the upright rods 12 and 14. The elongated rigid tubular member is then secured in place by use of the hangers 18 on the tallest rod 16.

Figure 3:
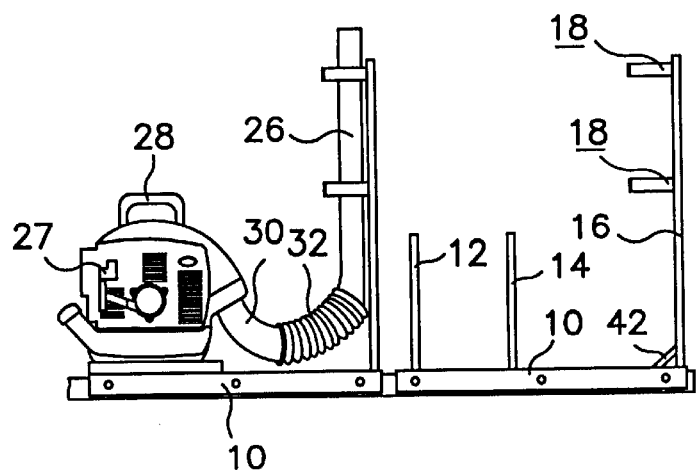
FIG. 3 illustrates two racks secured to a trailer body with a leaf blower secured to one rack.

In order to prevent anyone from removing the leaf blower who is not authorized a hole can be bored into one of the upright rods which matches with a hole in the back pack so that a lock 40 can be used to secure the back pack in place. In order to secure the lock after the leaf blower has been removed from the upright rods, an angular rod 42 can be secured between the tallest upright rod near the bottom and to the base 10 as shown in FIG. 3.

The storage rack not only provides a means of securing a leaf blower-back pack to the storage rack but also positions the leaf blower so that the fuel tank can be filled with fuel without any trouble. Further, the engine can be started while the leaf blower is stored on the racks. It would be obvious that more than one storage rack can be secured to one or more sides of the trailer in order to secure more than one leaf blower at the same time. FIG. 3 illustrates a blower on one rack and a separate rack to which another blower could be secured.

The size and length of the short rods are dictated by the size and length of the support openings of the back pack. The height of the tallest rod is such that the spaced brackets will secure the elongated rigid part of the air exhaust for the fan to which the rigid part is secured. In the situation in which the U-shaped brackets may be too wide to secure the blower tube, it would be obvious that a separate strap could be used in addition to the U-shaped brackets by which the rigid tubing is to be secured in place.

What is claimed is:

1. A leaf blower storage rack which comprises an elongated base (10), first and second spaced upright support members (12, 14) secured to said base, a third upright support member spaced from said second upright support member and secured to said base in parallelism with the first and second spaced upright support members; in which, said third upright member includes spaced U-shaped brackets for supporting a rigid air exhaust tubing of a leaf blower supported by the storage rack.

2. A leaf blower storage rack as set forth in claim 1; in which, the base is formed by a piece of angle iron to which the first, second, and third upright support members are secured.

3. A leaf blower storage rack as set forth in claim 2; in which, each run of the angle iron is provided with spaced holes by which the base can be secured to a support by suitable bolts and nuts.

4. A leaf blower storage rack as set forth in claim 1; in which, said base of said storage rack is metal and is secured to a support surface by welding.

5. A leaf blower storage rack as set forth in claim 1; in which, the base of the storage rack is secured to a support member by bolts and nuts.

6. A leaf blower storage rack as set forth in claim 1; in which, said base is secured to a wood support surface by lag screws.

7. A leaf blower storage rack as set forth in claim 5; in which, the base formed of wood to which said first, second and third upright support members are secured.

8. A leaf blower storage rack which comprises an elongated base (10), first and second spaced upright support members (12, 14) secured to said base, a third upright support member spaced from said second upright support member and secured to said base in parallelism with the first and second spaced upright support members; in which, one of first and second upright support members includes an aperture therein for passing a lock means for locking a leaf blower-back pack to the storage rack.

9. A leaf blower storage rack as set forth in claim 8; in which, means is provided to lock the locking means for safe keeping during a time that the leaf blower-backpack is removed from the storage rack.

10. A leaf blower storage rack as set forth in claim 8; in which, the base is formed by a piece of angle iron to which the first, second, and third upright support members are secured.

11. A leaf blower storage rack as set forth in claim 10; in which, each run of the angle iron is provided with spaced holes by which the base can be secured to a support by suitable bolts and nuts.

12. A leaf blower storage rack as set forth in claim 8; in which, said base of said storage rack is metal and is secured to a support surface by welding.

13. A leaf blower storage rack as set forth in claim 8; in which, the base of the storage rack is secured to a support member by bolts and nuts.

14. A leaf blower storage rack as set forth in claim 8; in which, said base is secured to a wood support surface by lag screws.

15. A leaf blower storage rack as set forth in claim 13; in which, the base formed of wood to which said first, second and third upright support members are secured.

16. A leaf blower storage rack as set forth in claim 8; in which, said third upright member includes spaced U-shaped brackets for supporting a rigid air exhaust tubing of a leaf blower supported by the storage rack.

17. A leaf blower storage rack as set forth in claim 9; in which, said third upright member includes spaced U-shaped brackets for supporting a rigid air exhaust tubing of a leaf blower supported by the storage rack.

18. A leaf blower storage rack as set forth in claim 10; in which, said third upright member includes spaced U-shaped brackets for supporting a rigid air exhaust tubing of a leaf blower supported by the storage rack.

19. A leaf blower storage rack as set forth in claim 11; in which, said third upright member includes spaced U-shaped brackets for supporting a rigid air exhaust tubing of a leaf blower supported by the storage rack.

20. A leaf blower storage rack as set forth in claim 12; in which, said third upright member includes spaced U-shaped brackets for supporting a rigid air exhaust tubing of a leaf blower supported by the storage rack.

21. A leaf blower storage rack as set forth in claim 13; in which, said third upright member includes spaced U-shaped brackets for supporting a rigid air exhaust tubing of a leaf blower supported by the storage rack.

22. A leaf blower storage rack as set forth in claim 14; in which, said third upright member includes spaced U-shaped brackets for supporting a rigid air exhaust tubing of a leaf blower supported by the storage rack.

23. A leaf blower storage rack as set forth in claim 15; in which, said third upright member includes spaced U-shaped brackets for supporting a rigid air exhaust tubing of a leaf blower supported by the storage rack.

* * * * *